FRANK R. KINNAN
*INVENTOR.*

GROUND LINE

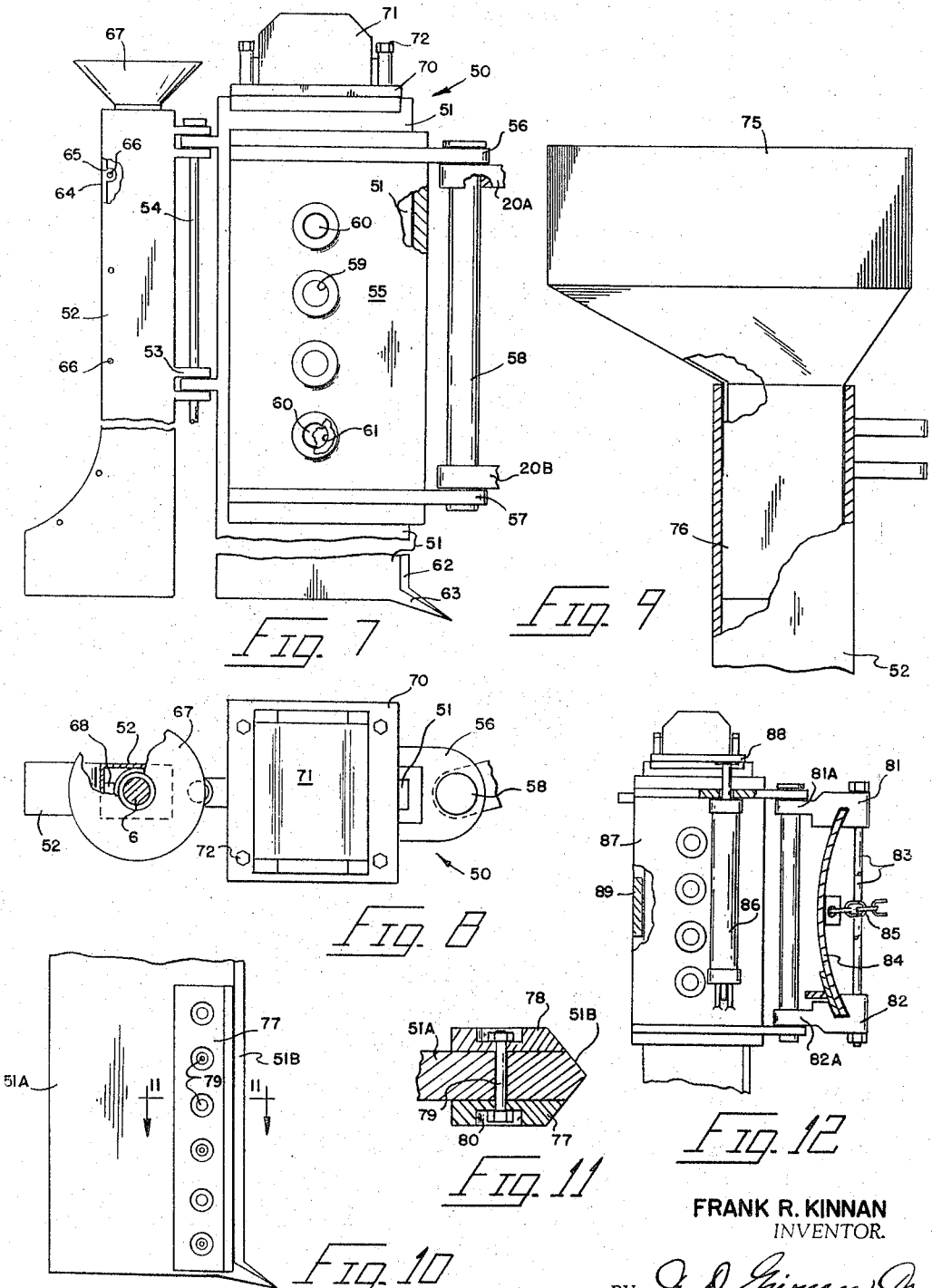

United States Patent Office 3,307,363
Patented Mar. 7, 1967

3,307,363
CABLE LAYING MACHINE
Frank R. Kinnan, Camas Valley, Oreg. 97416
Filed June 28, 1965, Ser. No. 467,490
7 Claims. (Cl. 61—72.6)

This invention relates to a cable or conduit laying device and more particularly to a device mounted on the side of a wheeled vehicle and adapted to be moved about a plurality of axes.

Presently in use in the cable laying field or art are numerous cable burying devices operated in conjunction with tractors of the track laying type. The use of wheeled vehicles has not been found practical for the reason that, in most instances, they cannot provide the tractive force necessary for advancement of the soil engaging plow. Limited use of wheeled vehicles has been made in certain instances where the cable being laid is of small diameter and being buried at shallow depths. Such a device is shown in the U.S. Patent No. 2,812,731, issued to G. F. Gardner.

The use of track type vehicles for cable laying has a number of disadvantages, one of which results from the vertical turning axis of the tractor being substantially ahead of the plow device causing undesirable lateral loads to be applied to the earth engaging element of the cable plow when turns are attempted. More significant is the prohibition of track type vehicles from paved roadways thus causing the cable or conduit along roadways to be buried by slow and costly means involving the separate steps of digging a trench, laying the cable and filling the trench. Most all appropriate governmental units have now enacted restraints against track type vehicles by reason of the damage inflicted upon the road surface by the lugs of the track. Coincidental governmental action in many areas has also resulted in the requirement that cable be placed in a buried manner primarily for aesthetic purposes. It is an object of this invention to provide a cable plow, borne by a wheeled vehicle and capable of performing not only those tasks heretofore accomplished by cable plows carried by track type tractors but, in addition, having capabilities not presently found in cable plowing devices.

A further advantage of the present invention is the provision of a cable plow and vehicle attaching means therefor permitting movement of the plow about a plurality of axes. In cable laying operations, as the prime mover advances, situations are encountered requiring the spaced relationship of the plow to the prime mover to be varied, as for example, the encountering of culverts requires altering the cable plow's depth, angular relation to the ground surface and horizontal relationship to the vehicle's centerline. Further, the means provided permits such positioning of the plow while the prime mover is in motion thus obviating delays and costly manual labor heretofore used in such instances.

Another important object is the provision of a cable plow positioned in relation to the operator of the prime mover so as to enable convenient viewing of the plow in operation. Close observation of the cable plowing operation by the operator coupled with precise steering afforded by a wheeled vehicle makes possible the laying of cable in an unusually accurate manner.

A further object of the present invention is to provide a cable plow having a plow blade provided with a vibratory unit for substantially decreasing the tractive force or pull required for advancing the cable plow horizontally through the ground.

Other objects include the provision of: cable plow attaching means positioning the plow so as to allow the following wheels of the vehicle to compact the soil along the trench cut by the plow to obviate the requirement of separate compaction equipment; means for applying finely granulated particles about the laid cable; and means for positioning the plow blade relative to its holder.

These and other objects and advantages of the present invention will become subsequently apparent upon study of the following specification and the drawings referred to therein and in which:

FIGURE 6 is an enlarged detail view of universal attachment means for the grader attachment beam.

FIGURE 7 is a fragmentary side elevational view of the cable plow of the present invention.

FIGURE 8 is a plan view of the cable plow of FIGURE 7 with parts broken away for purposes of illustration.

FIGURE 9 is a side elevation of a modified form of cable guide.

FIGURE 10 is a fragmentary side elevational view of a modified form of plow blade.

FIGURE 11 is a sectional view taken approximately along line 11—11 of FIGURE 10, and FIGURE 12 is a fragmentary side elevational view of a modified form of cable plow attached to the moldboard, in section, of a road grader machine.

Figure 1:
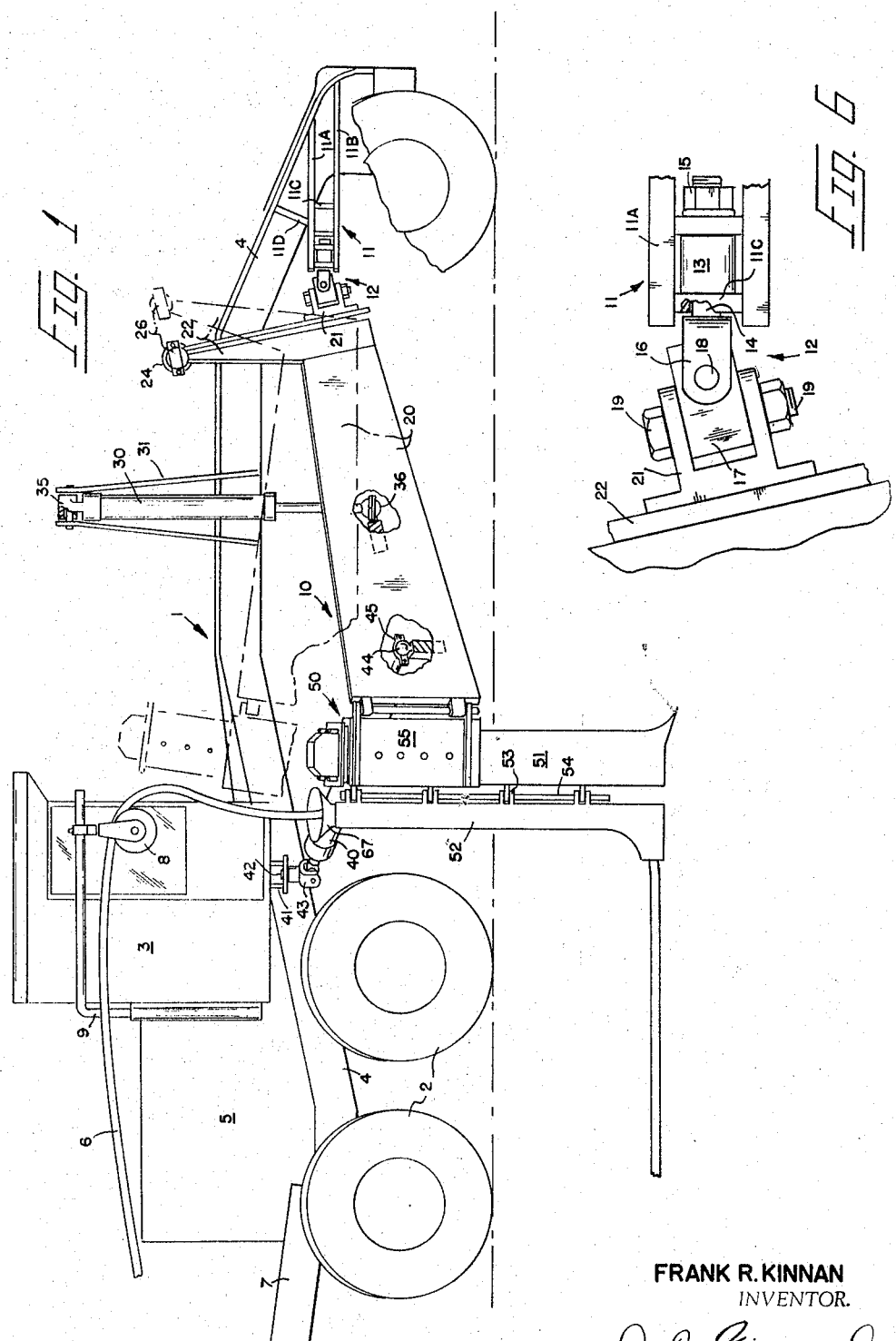
FIGURE 1 is a side elevational view of a road grader vehicle slightly inclined toward the viewer and provided with a cable laying assembly of the present invention.

With continuing reference to the drawings and particularly FIGURE 1 thereof, the numeral 1 indicates generally a power or road grader machine supported by ground engaging wheels 2 and which is preferably of the type having each wheel a driving wheel. The forward speed range of such vehicles is approximately two to twenty miles per hour. Typical of all grader vehicles is the provision of an integral hydraulic system for the operation of the ground engaging, normally horizontal blade and other accessories carried by such machines. A cab is indicated at 3 in which the machine operator is located and wherein applicable control devices are provided for the operation of the vehicle and equipment carried thereby. A frame 4 extends the length of the vehicle and diverges into a Y-shape toward its rearward end to support the cab 3 and a power source mounted within a cowling 5.

While the subject of this present invention is shown mounted laterally of a grader machine, it is understood that it may be adapted to use with existing other types of wheeled vehicles or to a like vehicle designed solely for cable laying operations.

Flexible cable or conduit 6 is payed from a reel (not shown) which may be carried by the power grader 1 by a pair of rearwardly extending arms 7 or by a second vehicle. The cable 6 is entrained over a sheave 8 supported by a swingable arm 9.

Indicated generally at 10 is a cable laying assembly including means for attachment to a bracket indicated generally at 11 near the forward end of the frame 4 of the power grader. The bracket 11 consists of a pair of horizontal plates 11A and 11B vertically spaced apart by vertical stiffeners as at 11C and is further reinforced by a member 11D welded to the frame and to the upper surface of plate 11A. Universal attachment means are indicated generally at 12, a detail view of which is provided by FIGURE 6, which includes a thrust bearing 13 secured intermediate two of the stiffeners 11C. The axis of the bearing 13 and the longitudinal axis or centerline of the grader define an angle of approximately fifteen degrees which will vary somewhat in other vehicle installations as hereinafter explained. Rotatably carried within the thrust bearing 13 is a shaft 14 threaded at its forward end to receive a nut 15 and terminating at its opposite end in a yoke formed by a pair of arms 16 providing part of a universal joint which further comprises an intermediate member 17 adapted for movement about the normally horizontal axis of a pin 18 pivotally securing the member 17 to arms 16. A bolt 19 extends downwardly through the intermediate member 17 at its rearward end to provide a substantially vertical pivot for an elongated member or beam 20. Bolt 19 is carried by a clevis plate 21 secured to an upwardly extending arm 22 provided at the forward end of beam 20.

Figure 4:
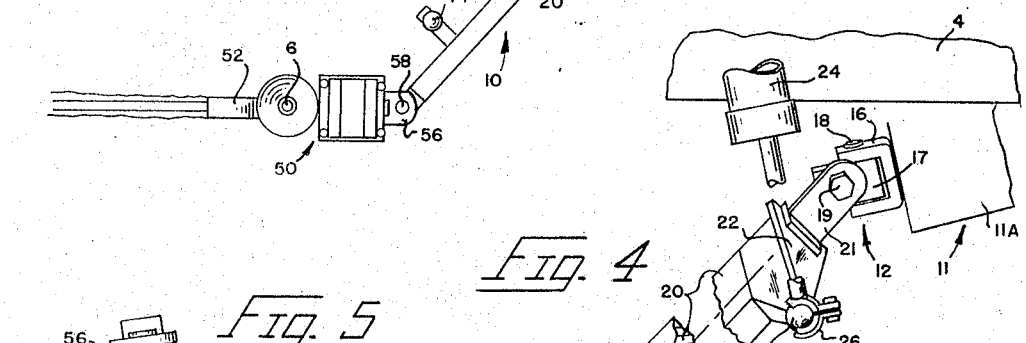
FIGURE 4 is an enlarged fragmentary plan view of the grader attachment beam and plow blade holder of FIGURE 3 with the beam rotated approximately 10 degrees about its longitudinal axis.

A ball member 23 of a first ball and socket joint is provided at the upper terminus of the arm 22. Supported by the frame 4 in an elevated, crosswise manner is a horizontally disposed double acting hydraulic cylinder 24 which is supported at its cylinder end by means of a ball joint 25. The end of the piston rod of hydraulic cylinder 24 terminates in a socket fitting 26 to receive the ball member 23. By means of conventional hydraulic circuitry including suitable controls (not shown) the above described cylinder provides means for rotating and holding the beam 20 about its longitudinal axis X (FIGURE 4) with the shaft 14 turning within thrust bearing 13 of the universal attachment means 12.

An upright double acting hydraulic cylinder indicated at 30, is mounted in an offset manner from the frame 4 by framework 31 comprising a pair of standards reinforced adjacent their upper ends by a third member in the form of a tube 32 welded at its bottom to a support 33 integral with the frame. Similar to the first mentioned horizontally disposed hydraulic cylinder 24, the cylinder 30 is pivotally attached at its cylinder and rod ends respectively by pivot means 35 and a socket fitting 36, with the latter in engagement with a ball member 37 carried by the beam 20. For the laying of cable at a depth of up to five feet, it has been found that cylinder 30 should be approximately forty-eight inches in length and six inches in diameter having a piston rod travel of slightly over forty inches. Through the hydraulic cylinder 30 a lifting force or, oppositely, a downward force may be exerted on the beam 20 for the positioning thereof about the normally horizontal axis of the pin 18.

Figure 3:
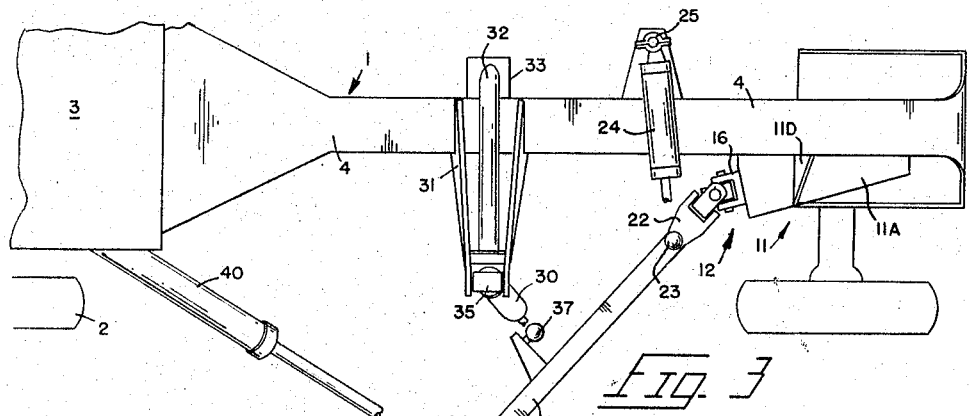
FIGURE 3 is a view similar to FIGURE 2 with the cable laying assembly positioned outwardly from the centerline of the vehicle.

A third double acting hydraulic cylinder 40 is pivotally mounted to the vehicle frame 4 by a support 41 in which one end of a vertical pivot pin 42 is positioned, the other end of which terminates in a yoke 43 to hingedly receive the end of cylinder 40. The piston rod end of cylinder 40 is provided with a ball receiving socket 45 forming a ball joint with a ball member 44 carried by the beam 20. As best shown in FIGURE 3, the hydraulic cylinder 40 provides means for swinging beam 20 outwardly to change the angular relationship of the latter relative to the centerline of the vehicle 1 about the substantially vertical axis of the bolt 19 of the universal attachment 12.

The hydraulic cylinders 30 and 40 are served by conduits (not shown) in circuit with conventional controls, similar to those associated with hydraulic cylinder 24, as above pointed out, to selectively extend, hold and retract their respective piston rods as desired.

The above described structure provides a beam 20 universally mounted at its forward end to a wheeled vehicle and positionable by hydraulic means associated therewith for selective movement about three separate axes.

A cable plow is indicated generally at 50 having an elongated ground engaging plow blade 51 to the trailing edge of which a cable shoe 52 is hingedly attached as at 53 by a rod 54. A plow blade holder 55, as best shown in FIGURE 7, is of U-shape in section and is provided with a pair of vertically spaced reinforcing members 56–57 which extend forwardly to receive a hinge pin 58 pivotally engaging said members with rearwardly extending lugs 20A and 20B of the beam 20. Reinforced apertures 59 within the holder 55 receive pins 60 selectively inserted within at least two of a series of apertures 61 in the plow blade 51 for positioning the lower ends of the blade and the cable shoe 52 at a predetermined distance from the blade holder 55. A shin portion 62 is provided along the leading edge of the plow blade 51 and terminates on a point 63 which extends downwardly and forwardly from the blade 51. For the laying of cable up to five feet below the ground's surface a blade eighty-six inches in length has proved satisfactory.

Secured to the top of the blade 51 by means of a platform 70 welded thereto is a vibratory unit 71 bolted as at 72 to the platform to impart to the blade a vertical vibratory motion. The unit 71 is preferably though not restrictively of the hydraulically driven type capable of frequencies to 8,000 vibrations per minute.

The cable shoe 52 is rectangular in section being closed at its rearward end by a removable closure plate 64 (FIGURE 7) which permits removal of a continuous cable from the shoe. The closure plate 64 is held in place by pins 65 extending through the side walls of the shoe and through openings formed in inwardly turned flanged portions 66 of plate 64. Fitted within the upper end of the cable shoe is a funnel shaped cable guide 67 having a cylindrical extension provided with spacer means as at 68 for stabilized retention of the guide within the cable shoe.

A modified form of cable guide is shown in FIGURE 9 in the form of a hopper 75 having a depending rectangular portion 76 for supported engagement with the cable shoe 52. Sand or other granular material carried by the hopper precipitates downwardly as the cable passes through the shoe 52 to provide a granular medium about the laid cable.

In FIGURES 10 and 11, a pair of plates 77 and 78 are shown secured to a plow blade 51A by bolts 79 for the purpose of widening the effective trench cutting portion of the blade to allow the use of cable shoes of widths greater than that of the plow blade. The plates 77 and 78 are beveled along their leading edges to match the angularity of the shin portion 51B. The bolts 79 extend through spaced apart apertures in the blade and terminate at their head end within recesses 80 in the plates 77 and 78.

A bracket for the attachment of a cable plow to the moldboard of a motor grader is shown in FIGURE 12 and comprises upper and lower clamping members 81 and 82 secured by bolts 83 to the moldboard 84. Lugs 81A–82A of the clamping members are the equivalent of the lugs 20A–20B carried by the beam 20. Since the cable plow is affixed adjacent the end of the moldboard, it is necessary to distribute the load imparted thereto by means of a length of chain 85 attached as its opposite end to the forward end of the frame 4. The bracket, so provided, permits the moldboard 84 to serve as plow support means similar to the beam 20 in view of a conventional moldboard's ability to move about a plurality of axes. FIGURE 12 also discloses powered means in the form of a hydraulic cylinder 86 affixed to one side of a blade holder 87. The piston rod of hydraulic cylinder 86 abuts the underside of a blade mounted platform 88 for positioning the blade relative to the holder. A crossmember 89 is provided at the rearward edge of the blade holder 87 to act as a keeper for the plow blade during the positioning thereof while pins 60 are temporarily removed from the holder. The plow blade of FIGURE 12 is provided with cable shoe attaching lugs adjacent its top and bottom ends only.

Operation

In a typical cable laying operation the beam 20 is positioned by hydraulic cylinders 30 and 24 which in turn locates the hingedly attached cable plow 50 at the desired depth and angularity in respect to the surface of the ground. A hole is formed in the ground to receive, at the specified depth, the lower end of the plow blade and trailing cable shoe prior to initial horizontal advancement.

Figure 2:
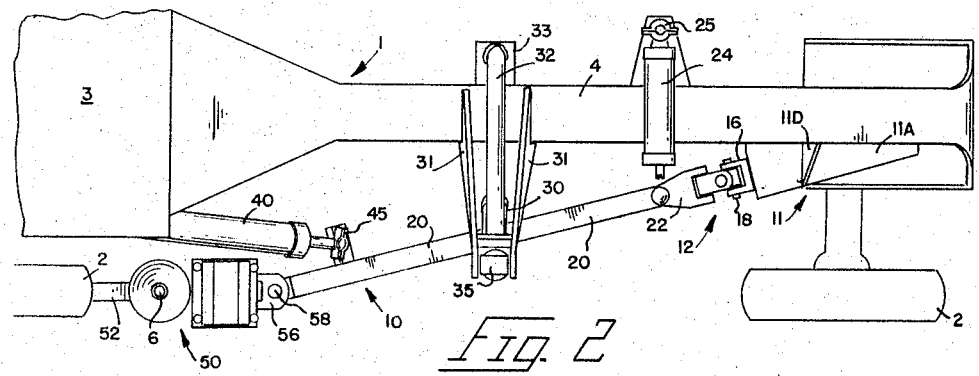
FIGURE 2 is a fragmentary plan view of the road grader and cable laying assembly shown in FIGURE 1.

FIGURE 2 shows in plan view the optimum cable laying configuration wherein cylinder 40 has positioned the beam 20 in such a manner as to trail the cable plow immediately forward of a vehicle wheel to thereby allow the wheel to serve as a means of ground compaction.

FIGURE 3 is a view similar to FIGURE 2 showing in plan view the beam 20 and the cable plow 50 positioned outward from the position of FIGURE 2 for the laying of cable along a lineal path further removed from the vehicle's longitudinal centerline. Such outward movement of the cable plow by cylinder 40 may be accomplished in a gradual manner without withdrawing or raising the blade 51 from the ground.

Figure 5:
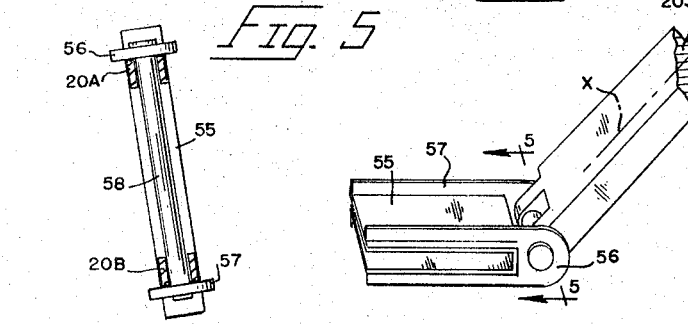
FIGURE 5 is a sectional, elevational view of the plow blade holder taken approximately along line 5—5 of FIGURE 4.

Cylinder 24 serves to position the beam 20 about its longitudinal axis X (FIGURE 4) which ultimately determines the transverse angular relationship of the cable plow to the ground surface. In FIGURE 5 the extension of the piston rod of cylinder 24 has caused the plow blade holder 55, and blade 51 to assume a transversely inclined angular position. The ability to vary the transverse angular relationship of the cable plow to the ground surface is advantageous when laying cable or conduit subjacent the shoulder of secondary roadways which, characteristically, are highly crowned. While all cable is laid to a certain specified depth and lateral distance from roadways, in certain instances it is necessary to vary both slightly such as, for example, when culverts are encountered. The end of a culvert exposed or extending through the shoulder of the road may be by-passed by horizontal positioning of the beam 20 and simultaneously changing the transverse angular relationship of the plow to the ground which will effectively guide the cable beneath and inwardly from said end of the culvert which heretofore was accomplished by a time-consuming manual operation.

The broken line position of the beam 20 and cable plow 50 of FIGURE 1 discloses the cable laying assembly elevated for travel of the vehicle to and from cable laying operations. The plow blade 51 is re-positioned upwardly within the blade holder 53 for maximum ground clearance.

While I have shown particular forms of embodiment of my invention, I am aware that many minor changes therein will readily suggest themselves to others skilled in the art without departing from the spirit and scope of the invention. Having thus described my invention, what I claim as new and desire to protect by Letters Patent is:

1. Apparatus for laying continuous lineal material in combination with a vehicle including an elongated chassis having a forward end and a rearward end, said apparatus comprising;
   an elongated member carried by said chassis laterally offset from the longitudinal axis thereof and substantially within the length of said chassis,
   said member trailing rearwardly relative to the forward end of said chassis,
   pivot means disposed rearwardly adjacent the forward end of said chassis and pivotally mounting the forward end of said member thereto allowing lateral and downward swinging movement of said member,
   a cable plow hingedly attached to the opposite end of said member, and
   hydraulic cylinders coupled with said member and with said vehicle for imparting swinging movement to said member whereby said cable plow may be selectively positioned relative to and offset from the longitudinal axis of said chassis.

2. The invention as claimed in claim 1 wherein said pivot means further includes means allowing said elongated member to move about its longitudinal axis and said hydraulic cylinders include a cylinder for imparting such movement to said member.

3. The apparatus as claimed in claim 1 wherein said cable plow includes vibratory means imparting oscillatory motion thereto to lessen the resistance of the ground to the passage of said plow therethrough.

4. The apparatus as claimed in claim 1 wherein said cable plow includes an upright plow blade, a blade holder, said holder being hingedly attached to said elongated member, at least one hydraulic cylinder having a piston rod, means attaching one end of the cylinder to said blade holder and the outer end of said piston rod being in abutment with said blade for positioning the latter vertically within said holder.

5. The apparatus as claimed in claim 1 wherein said pivot means mounts said member to said chassis for movement of said member about a substantially horizontal axis, an upright axis and a second horizontal axis, the later axis being substantially parallel to the axis of vehicle movement and said hydraulic cylinders being operable to position said member about each axis whereby said cable plow carried by said member may be placed respectively at a selected depth and distance from one side of the axis of said chassis and in a transversely inclined relationship to the ground surface.

6. The invention as claimed in claim 1 wherein said vehicle is supported by pneumatic tires some of which are steerable for travel along paved surfaces without imparting damage to same.

7. The invention as claimed in claim 1 wherein said cable plow includes a ground penetrating blade, a blade holder, said holder being hingedly attached to said member, a cable shoe carried by said blade and constituting a guideway for the downward passage therethrough of the cable being laid, and a hopper supported by and in open communication with the upper end of said shoe, said hopper adapted to receive a quantity of granular material whereby the downward gravitation of the material will facilitate the passage of the cable being laid through the shoe.

References Cited by the Examiner

UNITED STATES PATENTS

| 259,248 | 6/1882 | Wasson | 61—72.5 |
|---|---|---|---|
| 1,863,671 | 6/1932 | Pitts et al. | 61—72.6 |
| 2,386,025 | 10/1945 | Wills. | |
| 2,414,994 | 1/1947 | Wright | 37—98 |
| 2,663,515 | 12/1953 | Kinsinger | 61—72.6 X |
| 2,766,536 | 10/1956 | Perkins | 37—144 |
| 2,850,815 | 9/1958 | Edwards | 37—141 |
| 2,952,929 | 9/1960 | Linberg | 37—145 |
| 3,039,209 | 6/1962 | Cron et al. | 37—98 |
| 3,140,745 | 7/1964 | Hinkle et al. | 37—193 X |
| 3,170,300 | 2/1965 | Kelley | 61—72.6 |
| 3,175,368 | 3/1965 | Tibbits | 61—72.6 |
| 3,222,876 | 12/1965 | Harmstorf | 61—72.6 X |
| 3,232,358 | 2/1966 | Heiberg | 61—72.6 X |

FOREIGN PATENTS

| 410,900 | 5/1934 | Great Britain. |
|---|---|---|
| 536,741 | 5/1941 | Great Britain. |
| 1,320,979 | 2/1963 | France. |

EARL J. WITMER, *Primary Examiner.*